(12) United States Patent
Qureshi et al.

(10) Patent No.: US 7,087,703 B2
(45) Date of Patent: Aug. 8, 2006

(54) PHENOLIC RESIN COMPOSITIONS CONTAINING ETHERIFIED HARDENERS

(75) Inventors: Shahid P. Qureshi, Duluth, GA (US); Charles C. Chan, Snellville, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 10/898,563

(22) Filed: Jul. 26, 2004

(65) Prior Publication Data

US 2006/0020102 A1 Jan. 26, 2006

(51) Int. Cl.
*C08G 14/04* (2006.01)

(52) U.S. Cl. ...................................... 528/141; 528/143
(58) Field of Classification Search ............... 528/141, 528/143
See application file for complete search history.

(56) References Cited

U.S. PATENT DOCUMENTS

| | | | |
|---|---|---|---|
| 2,599,807 A | 6/1952 | Bersworth | |
| 2,609,390 A | 9/1952 | Bersworth | |
| 2,841,611 A | 7/1958 | Bersworth et al. | |
| 2,993,067 A | 7/1961 | Megerlein et al. | |
| 3,121,697 A | 2/1964 | Gizard et al. | |
| 3,234,140 A | 2/1966 | Irani et al. | |
| 3,298,956 A | 1/1967 | Irani et al. | |
| 3,341,340 A | 9/1967 | Sawyer et al. | |
| 3,395,113 A | 7/1968 | Irani et al. | |
| 3,422,046 A | 1/1969 | Thomas et al. | |
| 3,423,369 A | 1/1969 | Nachbur et al. | |
| 3,440,201 A | 4/1969 | Sempert et al. | |
| 3,470,112 A | 9/1969 | Irani et al. | |
| 3,483,178 A | 12/1969 | Crutchfield et al. | |
| 3,562,197 A | 2/1971 | Sears et al. | |
| 3,932,303 A | 1/1976 | Hollinghad | |
| 3,983,098 A | 9/1976 | Bussi et al. | |
| 4,061,695 A | 12/1977 | Tai et al. | |
| 4,100,231 A | 7/1978 | Tai et al. | |
| 4,111,880 A | 9/1978 | Abendroth et al. | |
| 4,246,157 A | 1/1981 | Laitar | |
| 4,256,844 A | 3/1981 | Martin et al. | |
| 4,331,583 A | 5/1982 | Everett | |
| 4,338,209 A | 7/1982 | Manabe et al. | |
| 4,404,313 A | 9/1983 | Leitner | |
| 4,419,400 A | 12/1983 | Hindersinn | |
| 4,505,748 A | 3/1985 | Baxter | |
| 4,661,280 A | 4/1987 | Ouhadi et al. | |
| 4,662,173 A | 5/1987 | Wilkinson | |
| 4,671,934 A | 6/1987 | Terry et al. | |
| 4,751,320 A | 6/1988 | Masuda et al. | |
| 4,785,040 A | 11/1988 | Gupta et al. | |
| 4,786,431 A | 11/1988 | Broze et al. | |
| 4,918,122 A | 4/1990 | Dellar et al. | |
| 4,927,550 A | 5/1990 | Cutcher et al. | |
| 4,983,654 A | 1/1991 | Cheung et al. | |
| 4,994,581 A | 2/1991 | Takeda et al. | |
| 5,002,126 A | 3/1991 | Carlberg et al. | |
| 5,008,036 A | 4/1991 | Crompton et al. | |
| 5,057,238 A | 10/1991 | Broze et al. | |
| 5,096,983 A | 3/1992 | Gerber | |
| 5,115,083 A | 5/1992 | Piedrahita et al. | |
| 5,152,177 A | 10/1992 | Buck et al. | |
| 5,196,070 A | 3/1993 | Ables et al. | |
| 5,243,015 A | 9/1993 | Hutchings et al. | |
| 5,344,909 A | 9/1994 | Hutchings et al. | |
| 5,378,793 A | 1/1995 | Oprin | |
| 5,387,655 A | 2/1995 | Aslin | |
| 5,864,003 A | 1/1999 | Qureshi et al. | |
| 6,133,403 A | 10/2000 | Gerber | |
| 6,228,914 B1 | 5/2001 | Ford et al. | |
| 6,326,453 B1 | 12/2001 | Asami et al. | |
| 6,372,878 B1 | 4/2002 | Wernik et al. | |
| 6,706,809 B1 | 3/2004 | Tutin et al. | |
| 6,730,770 B1 | 5/2004 | Coventry-Saylor | |

FOREIGN PATENT DOCUMENTS

| | | | |
|---|---|---|---|
| EP | 05389098 | | 4/2003 |
| GB | 812390 | | 4/1959 |
| GB | 1604657 | | 12/1981 |
| JP | 56067342 | * | 6/1981 |
| WO | WO 93/05118 | | 3/1993 |
| WO | WO 98/03568 | | 1/1998 |

OTHER PUBLICATIONS

Derwent Abstract 1981-54011d, Sumitomo Bakelite.*
Caplus AN 1981:570382, Sumitomo Bakelite.*
Resolution Performance Products, Product Data Sheet, Cardura Glycidyl Ester E10P and Heloxy Modifier 8, Re-issued Oct. 2002, pp. 1-7.
Material Safety Data Sheet, M-1839, P Chem, 100 Old Latexo Road, Latexo, TX, received Mar. 11, 2004, 2 pages.
International Search Report for PCT/US2005/025629.
Written Opinion for PCT/US2005/0025629.

* cited by examiner

*Primary Examiner*—Jeffrey Mullis
(74) *Attorney, Agent, or Firm*—Banner & Witcoff, Ltd

(57) ABSTRACT

This invention relates to a resin composition capable of being thermally cured while minimizing or eliminating voids in the resulting composite, the composition having both a long pot life at low temperatures and a fast curing rate at higher temperatures containing a mixture of (a) a phenol-formaldehyde resole resin, and (b) an etherified hardener, the etherified hardener being prepared from an alkoxylated polyol or a mono epoxy functional diluent.

46 Claims, No Drawings

PHENOLIC RESIN COMPOSITIONS CONTAINING ETHERIFIED HARDENERS

FIELD OF THE INVENTION

The present invention relates to a phenolic resin composition having a long pot-life and satisfactory cure speed under curing conditions while minimizing voids in cured composites.

BACKGROUND OF THE INVENTION

Phenolic resole resins have long been cured with strong acids, such as sulfuric acid and organo-sulfonic acids. When used alone, these acids cause rapid hardening of most resole resins even at an ambient temperature, complicating the use of such resins for many applications particularly in making fiber reinforced plastic (FRP) and other resin composites and molded resin articles. The prior art, therefore, has long sought ways to retard the rate of resin cure at temperatures below the desired curing condition as a way of prolonging the pot life of such resin systems. To be useful, however, such cure rate retardation must be accomplished without degrading, to an unacceptable extent, the ultimate cure rate of the resin at the elevated cure temperature.

In U.S. Pat. No. 5,243,015, a latent catalyst comprising a salt of a primary or secondary amine and a strong acid is used. This latent catalyst improves storage stability (pot life) of the resole resin composition, while providing a cure rate at an elevated temperature comparable to the rate obtained using conventional strong acid catalysts. Strong acids also may be added to the composition, to an extent to act synergistically with the latent catalyst to accelerate the rate of reaction; but preferably not in an amount which would cure the resin at a commercially useful rate by itself.

U.S. Pat. No. 5,378,793 (European Patent Application 539,098) represents another approach. This patent discloses using a partial phosphate ester as a hardener for phenolic resole resins. The partial phosphate ester is prepared by reacting (partially esterifying) condensed phosphoric acids, such as orthophosphoric acid, pyrophosphoric acid, tetraphosphoric acid or phosphorus pentoxide under stringent conditions of temperature and vacuum, with polyols, such as glycerol, pentaertrythritol, sucrose and others to a constant free acidity value.

It is reported that the partial phosphate ester hardener exhibits a delayed action, i.e., the hardener cures the resole relatively slowly at a lower temperature, but allows a rapid cure when the temperature is increased. The patent attributes this result to dissociation of the ester at an elevated temperature to release free acid which acts as the hardener and promotes the cure reaction. At lower temperatures, however, the partial ester is stable (i.e., has a relatively low acid value) and does not contribute to a premature cure of the resole.

U.S. Pat. No. 5,864,003, incorporated herein in its entirety, represents another approach. This patent discloses using a latent curing agent selected from a particular class of nitrogen-containing acidic phosphorus compounds made from either phosphoric acid or phosphorous acid. Phosphoric acid equivalents may also be used such as pyrophosphoric acid, tetraphosphoric acid or phosphorus pentoxide as the phosphoric acid source.

Phenolic resole resins are cured in such applications as in making fiber reinforced plastic (FRP) and other resin composites and molded resin articles. The use of fiber reinforced plastic (FRP) and other resin composites and molded resin articles has experienced substantial growth as new applications of composites for products with greater strength and durability are devised. Many products are manufactured with FRP and other resin composites such as building materials, appliances, boats, or sporting equipment. For example, composites based on phenolic resins are applied in various products ranging from construction materials to mass transit trains, competing with and frequently replacing metals as the material of choice.

Studies have shown that FRP strengthened material such as phenolic resin composites possess fire resistance such that material strengthened with FRP can withstand sustained periods of time under fire conditions before failure would occur. In addition to fire resistance, phenolic resins under fire conditions emit low smoke or toxic fumes and resist the spread of flames. Such fire resistant qualities of the composites have increased interest and applicability of phenolic resin compositions. Phenolic resin compositions are thus becoming the material of choice for the production of composite parts, especially where public safety is critical.

Fabricators may utilize many production methods for making products with the composites. For example, in compression molding, a fabricator may compress compounds between heated matched mold surfaces to mold the compounds. Also, resin transfer molding (RTM) may be used in which a catalyzed resin is injected into matched molds and cured at particular temperatures.

However, composite fabrication processes providing cured phenolic resin compositions may generate undesirable voids in the resultant composite. The incidence of voids has been encountered using the latent curing agent of U.S. Pat. No. 5,864,003. In many applications of phenolic resins, voids must be minimized. Hence, there remains an interest in developing phenolic resin compositions having a cure behavior that provide a long pot life at temperatures below curing conditions, but exhibit a rapid hardening at elevated cure temperatures and result in composites with minimal voids.

SUMMARY OF THE INVENTION

The present invention is directed to a phenolic resole resin composition capable of being thermally cured having both a long pot life at temperatures below curing conditions and a fast curing (hardening) rate at a higher curing temperature while minimizing or eliminating voids or pinholes in the resulting composite.

The present invention is based upon the discovery that certain etherified phosphate esters, hereinafter alternatively referred to as the etherified phosphate ester latent catalyst, desirably alter the hardening behavior of phenolic resole resin compositions. In particular, the invention is directed to the use of certain etherified phosphate esters including phosphate esters of an alkoxylated polyol or phosphate esters of a mono-epoxy.

One class of such etherified phosphate ester latent catalysts includes phosphate esters of ethoxylated trimethylol propane formed as a reaction product of polyphosphoric acid and an ethoxylated trimethylol propane. Ethoxylated trimethylol propane is commercially available and may be prepared using known technology by reacting ethylene oxide with trimethylol propane. One suitable ethoxylated trimethylol propane is prepared by reacting three moles of ethylene oxide per mole of trimethylol propane. To prepare the etherified phosphate ester, polyphosphoric acid is first charged into a reactor and heated to 150–175° F. (65–80° C.). An amount of the ethoxylated trimethylol propane is then added to the polyphosphoric acid with mixing to provide one mole of ethoxylated trimethylol propane per three moles of phosphoric acid and to form the phosphate ester of ethoxylated trimethylol propane. The reaction may be conducted at atmospheric pressure conditions. Temperature is not usually a concern, though cooling may be desired for safety.

Another class of such etherified phosphate ester latent catalysts includes products formed by reacting phosphoric acid with a mono-epoxy. For example, the etherified phosphate ester latent catalyst may be prepared using phosphoric acid and an aliphatic monoglycidyl ether containing alkyl chains predominantly $C_{12}$ and $C_{14}$ in length. The aliphatic monoglycidyl ether is reacted with phosphoric acid to form the etherified phosphate ester latent catalyst. Also, the etherified phosphate ester latent catalyst may be prepared using a glycidol ester of a synthetic saturated monocarboxylic acid mixture of highly branched $C_{10}$ isomers.

In preferred practice, the present invention is directed to the use of a combination of such an etherified phosphate ester latent catalyst with a strong acid catalyst for use as the hardening agent of a phenolic resole resin composition. The etherified phosphate ester latent catalyst and the strong acid catalyst are preferably present in the phenolic resole resin composition in a sufficient amount, and in a suitable weight ratio, which does not prematurely cure the phenolic resole resin at a temperature below a desired elevated hardening temperature for the resin, but which causes a rapid hardening of the resin at the desired cure (hardening) temperature. With the combination of the etherified phosphate ester latent catalyst and the strong acid catalyst, such phenolic resole resin compositions exhibit both a long pot life at below the curing temperature and a rapid cure at the elevated hardening temperature and result in a composite with minimal voids or pinholes.

The present invention also is directed to a method of making a phenolic resole resin composition comprising reacting phenol with formaldehyde under alkaline conditions to form a phenolic resole resin, neutralizing the resin, adding an etherified phosphate ester latent catalyst, and optionally adding a strong acid catalyst, wherein the etherified phosphate ester latent catalyst is added in a sufficient amount to retard the curing of the resin at a first lower temperature, in the presence of the optional strong acid catalyst, but to permit a rapid cure at a second higher temperature and to reduce or eliminate voids or pinholes in the resulting composite.

The present invention is further directed to a method of making a resin composite comprising curing (hardening) a resin composition at an elevated temperature. Also, the method may comprise a first step of impregnating a substrate with the resin composition and then curing (hardening) the composition at an elevated temperature. Preferably the substrate is impregnated at an ambient temperature to slightly above ambient temperature.

Additional advantages of the invention will be set forth in part in the description which follows, and in part will be apparent from the description, or may be learned by the practice of the invention. The advantages of the invention may be realized and obtained by means of the elements and combinations particularly pointed out in the claims.

It is to be understood that both the foregoing general description and the following detailed description are exemplary and explanatory only and are not restrictive of the present invention as claimed.

DETAILED DESCRIPTION OF THE INVENTION

The present invention is directed to a predominantly aqueous phenolic resole resin composition capable of being thermally cured, i.e., a thermosetting resin composition, comprising a mixture of a phenolic resole resin and particular etherified phosphate ester latent catalysts. The etherified phosphate ester latent catalyst is present in the phenolic resole resin composition in an amount sufficient to retard curing (hardening) of the resin at a first lower temperature, in the presence of an optional strong acid catalyst, and to permit a rapid cure at a second higher temperature. Furthermore, use of the etherified phosphate ester latent catalyst of the present invention has shown the ability to minimize or eliminate the formation of voids in the resulting composite.

As used throughout the specification and claims the phrase "phosphoric acid" is intended to include orthophosphoric acid comprising an aqueous solution of up to 85% as $H_3PO_4$ as well as condensed (dehydrated) forms, such as pyrophosphoric acid, polyphosphoric acid and phosphoric anhydride (phosphorous pentoxide), as well as mixtures thereof.

The etherified phosphate ester latent catalyst is formed by adding one of an alkoxylated polyol or a mono-functional epoxy diluent (mono-epoxy), as hereafter described, to a reactor with mixing, the reactor containing phosphoric acid. The reaction proceeds at atmospheric pressure and the process need only employ sufficient temperature control (e.g., cooling) to avoid safety concerns.

In one embodiment, the etherified phosphate ester latent catalyst comprises the phosphate ester reaction product of an alkoxylated polyol and phosphoric acid, preferably a condensed form of phosphoric acid, and especially polyphosphoric acid. The reaction is conducted under atmospheric pressure conditions by adding the alkoxylated polyol to the phosphoric acid. Specific examples of alkoxylated polyols for preparing the phosphate ester include but are not limited to ethoxylated, propoxylated or butoxylated glycerol, pentaerythritol, sucrose, di- or polyhydric phenols, resorcinol, phloroglucinol, neopentyl glycol, trimethylol propane, or the like. Such alkoxylated polyols are known and commercially available. Preferably, an alkoxylated polyol that is fluid at the conditions for preparing the phosphate ester, e.g. at a temperature of about 65° C. to about 80° C., is used. Ethoxylated trimethylol propane is normally preferred for many applications. For example, ethoxylated trimethylol propane is a commercially available material and one suitable product may be prepared by reacting three moles of ethylene oxide with one mole trimethylol propane using methods known in the art. The resulting product of the reaction between the ethoxylated trimethylol propane and phosphoric acid is the phosphate ester of the ethoxylated trimethylol propane.

Using polyphosphoric acid as the phosphoric acid source produces a phosphate ester product having a mixture of ortho and meta phosphates typically in a molar ratio of 1:2 (ortho:meta). If superphos, a mixture of essentially equal amounts of orthophosphoric (85%) acid and pyrophosphoric (105%) acid, is used as the phosphoric acid source, then the ortho to meta ratio in the phosphate ester is typically about 1:1. Finally, if 85% phosphoric acid is used, the phosphate ester is predominantly an orthophosphate.

The final phenolic curing catalyst preferably is formed by blending the phosphate ester with a strong acid and optionally phosphoric acid. For example, 40–80% of the phosphate ester is blended with 5–25% strong acid (e.g., p-toluene sulfonic acid) and 0–20% phosphoric acid to form the curing catalyst.

In another embodiment, the phenolic curing catalyst contains as the phosphate ester latent catalyst component the adduct (reaction product) of phosphoric acid and a mono epoxy functional diluent. Suitable epoxy functional diluents can be represented by the following formula:

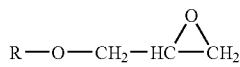

where R is an alkyl of 1 to 18 carbon atoms or an alkyl carbonyl

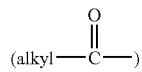

of 1 to 18 alkyl carbon atoms, where the alkyl can be straight or branched. In a preferred embodiment, R is an alkyl of 8 to 16 carbon atoms or an alkyl carbonyl of 8 to 16 alkyl carbon atoms.

For example, an aliphatic monoglycidyl ether containing alkyl chains which are predominantly $C_{12}$ and $C_{14}$ in length may be used to prepare the phosphate ester. Heloxy™ Modifier 8 (available from Resolution Performance Products) is an aliphatic monglycidyl ether that may be used in the formation of the etherified phosphate ester latent catalyst component of the phenolic curing catalyst. In this example, Heloxy™ Modifier 8 may be reacted with phosphoric acid (85%) to form the phosphate ester and then blended with a strong acid (e.g., p-TSA) to form the phenolic curing catalyst. Also, a glycidol ester of a synthetic saturated monocarboxylic acid mixture of highly branched $C_{10}$ isomers (e.g., Cardura™ Glycidyl Ester E10P, available from Resolution Performance Products) may be used to form the etherified phosphate ester latent catalyst.

In one arrangement, the present invention is directed to a phenolic resole resin composition capable of being thermally cured comprising a mixture of (a) a phenolic resole resin, (b) an etherified phosphate ester latent catalyst as described, and (c) an optional strong acid catalyst, wherein the etherified phosphate ester latent catalyst is present in a sufficient amount relative to the optional strong acid to retard the curing (hardening) of the resin at a first lower temperature in the presence of the optional strong acid catalyst, but to permit a rapid cure at a second higher temperature with minimal voids.

The phenolic resole resin may be prepared in a known manner from known starting materials. Such resins are prepared by reacting, under alkaline conditions, an aldehyde component and a phenol component such that reactive methylol groups are formed in the resin product. For example, suitable phenolic resole resins may be produced by reacting formaldehyde and a phenol component in an aqueous reaction medium under alkaline reaction conditions. An alkaline reaction condition can be established by use of any of the wide variety of basic catalysts, organic and inorganic, known to those skilled in the art. On the basis of cost and performance, an alkali metal hydroxide, and usually sodium hydroxide, is often the catalyst of choice. However, in many instances amine catalysts are also preferred.

The phenolic resole resin preferably is prepared so that it contains a large proportion of highly reactive, highly methylolated phenolic dimer species, including tetra-, tri- and dimethylolated phenolic dimer species. More preferably, the resin contains a large proportion of the tetramethylolated phenolic species or tetradimers, e.g., 4 to 8 wt % of the resin. The methylol groups are capable of reacting with one another at elevated temperatures with or without the addition of auxiliary catalysts. Such resins can cure under the influence of both basic and acidic catalysts. The present invention is directed to curing (hardening) the resin in the presence of an acid catalyst.

Suitable phenolic resole resins for use in the present invention are prepared using a mole ratio of formaldehyde to phenol preferably of at least about 0.9:1, and more preferably at least about 1:1, up to a mole ratio of about 3.5:1 and more preferably up to about 1.85:1. Particularly useful phenolic resole resins in the present invention exhibit a long pot life and a lower tendency to show strong exotherms of the type which initiate at 55° C.

The phenol component used to prepare the phenolic resole resin includes any phenol typically used in preparing phenolic resole resins, which are not substituted at either the two ortho positions or at one ortho and the para position, such unsubstituted positions being necessary for the desired polymerization (dimerization, trimerization, etc.) reactions to occur. Phenols substituted in these positions may be used in lesser quantities (e.g., up to about 30 weight %, and generally not more than about 10 weight %, of the phenol component) as it is known in the art to control molecular weight by a chain termination reaction. Any one, all, or none of the remaining carbon atoms of the phenol ring can be substituted in a conventional fashion. The nature of these substituents can vary widely, and it is only necessary that the substituent not interfere in the polymerization of the aldehyde with the phenol at the ortho and/or para positions thereof. Furthermore, at least a portion of the phenol component must include a phenol not blocked at either of the ortho and the para positions (i.e., a trifunctional phenol) so that the resin is thermosettable. Preferably, at least 10% by weight of the phenol component should include such trifunctional phenols, more preferably at least 25% by weight, most preferably at least 75% by weight and usually the phenol component consists essentially entirely of such trifunctional phenol.

Substituted phenols employed in the formation of the phenolic resins include, for example, alkyl substituted phenols, aryl substituted phenols, aralkyl substituted phenols, cycloalkyl substituted phenols, alkenyl-substituted phenols, alkoxy substituted phenols, aryloxy substituted phenols, and halogen-substituted phenols, the foregoing substituents possibly containing from 1 to 26, and usually from 1 to 9, carbon atoms.

Specific examples of suitable phenols for preparing the resole resin composition of the present invention include: hydroxybenzene (phenol), o-cresol, m-cresol, p-cresol, 3,5-xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, phenylethyl, 3,5-dimethoxy phenol, 3,4,5-trimethoxy phenol, p-ethoxy phenol, p-butoxy phenol, 3-methyl-4-methoxy phenol, p-phenoxy phenol and mixtures thereof. Ordinary phenol normally is preferred for most applications. The phenol component may also include a small amount of di-functional phenol such as resorcinol, catechol, or hydroquinone or p,p'-dihydroxy bi-phenyl.

Formaldehyde can be used alone or in combination with any of the aldehydes or their equivalents heretofore employed in the formation of phenolic resole resins including, for example, acetaldehyde, propionaldehyde, butylaldehyde furfuraldehyde, and benzaldehyde. In general, the aldehydes employed have the formula R'CHO wherein R' is a hydrogen or hydrocarbon radical generally of 1–8 carbon atoms. It will be appreciated that some aldehydes, e.g., acetaldehyde and butylaldehyde, improve toughness of the resole resin at the expense of lowering the HDT thereof (heat distortion temperatures, as determined by American Society for Testing and Materials ASTM D-648). Also, it is contemplated that difunctional aldehydes can be used to prepare the phenolic resin, and could advantageously be used to introduce cross-links into the cured resin. Ordinary formaldehyde is preferred for most applications. Formaldehyde can be supplied in any one of its commonly available forms including formalin solutions and paraformaldehyde.

It also is contemplated that the phenolic resole resin can be prepared in the presence of other resin modifier monomers such as urea, furan and melamine. It is intended that such modified phenolic resins be included in the thermosetting phenolic resole resin compositions of the present invention.

The resole resin composition of the present invention preferably has a solids level of about 60 to 95%, more preferably about 70 to 90%, although higher or lower solids may be used depending on specific applications. The viscosity of the composition is usually from about 200 cp to 5000 cp, and usually about 300 to 1500 cp, measured at 25° C. As with solids content, both higher and lower viscosities may be used depending on specific applications. The composition preferably has a free phenol content below 15% by weight and a free aldehyde content below 3% by weight, more preferably below 1.0% by weight, based on the weight of the resin composition.

In order to achieve the desired free aldehyde content, it is contemplated that the phenolic resole resin can be treated with an aldehyde scavenger to lower the amount of free aldehyde in the resin. The scavenger is added in amounts sufficient to reduce the level of free aldehyde without significantly affecting the cure rate or desirable strength of the cured resin. It is preferred to use between 0.5 and 1.5 mole equivalents of scavenger per mole of free aldehyde present at the end of the resole preparation. Typical aldehyde (formaldehyde) scavengers include urea, melamine, toluene sulfonamide and dicyandiamide. Preferable scavengers are urea and toluene sulfonamide.

A variety of other modifiers also can be added into the resole resin in order to improve toughness and other cured resin properties. These modifiers include, for example, chain terminating phenols, glycols, with or without halogen substitution for additional fire retardancy, polyester polyols, polyether polyols, alkyl phenols, hydroxy-containing acrylates, and the like and mixtures thereof. The proportion of such modifiers incorporated into the resole resin composition typically ranges from 5 to 35 weight percent (based on the phenol component.) Other modifiers such as fire retardants and fillers can be added to complete the phenolic resole resin composition. Reactive modifiers can be added to the resole resin after it has been formulated such as di- and higher polyols, e.g., di- or polyhydric phenols, resorcinol, phloroglucinol, and the like. Finally, modifiers to achieve special effects in particular applications may be appropriate, e.g., polyvinyl butyrals, or epoxies for better impact strength in composites.

Another component which may be used in phenolic resole resin compositions of the present invention is an organic solvent. While the resin composition is predominantly aqueous, a variety of organic solvents can be used in diluting the phenolic resole resin composition to a desired solids concentration or viscosity for certain applications. Suitable organic solvents include aromatic solvents including benzene, toluene, xylene, ethyl benzene, and the like, polar solvents such as furfural, furfuryl alcohol (which co-reacts under acid conditions) various Cellosolves, carbitols, ketones, and various alcohols such as ethylene glycol, benzyl alcohol and the like. Generally, such organic solvents may constitute up to 50 weight percent of the total solvent, and preferably not more than 25 weight %. For environmental reasons, water is the preferred as the sole solvent.

The etherified phosphate ester latent catalyst may be used as the sole curing (hardening) agent and may constitute about 2–20 weight percent of the phenolic resin solids and more preferably about 8–12 weight percent although higher or lower proportions may be used depending on specific applications. The etherified phosphate ester latent catalyst may also be used in combination with conventional acid hardeners or acid catalysts. When used in combination with strong acid catalysts the relative proportion of the latent catalyst to the strong acid can be widely varied depending on the desired curing performance. Selecting any particular proportion is well within the skill of the art using only routine experimentation, especially in view of the specific examples hereafter provided. Acid catalysts are conventional strong acid catalysts known in the art. Such acids include inorganic acids such as hydrochloric, sulfuric, and phosphoric acid, and organic acids such as trichloracetic, sulfamic, aromatic di- and polysulfonic, e.g., phenyl sulfonic and other organo-sulfonic acids, conventional latent strong acid catalysts such as acid chlorides, and mixtures thereof. Preferred strong acid catalysts include a mixture of phosphoric acid and a strong organo-sulfonic acid such as the commercially available mixture of toluene and xylene sulfonic acids provided in ethylene glycol solvent, or methane sulfonic acid.

Generally, an aromatic sulfonic acid, such as p-toluene sulfonic acid (p-TSA) is used as the acid catalyst. By varying the relative amount of etherified phosphate ester latent curing catalyst and optional strong acid catalyst, one can control the activity of the hardener composition and ultimately the optimization of the physical properties of the hardened phenolic resole resin composition.

In the context of the present invention, low to ambient temperatures typically can be considered as less than 40° C., and preferably between about 0° C. and 35° C., and most usually between 0° C. and 25° C.

The strong acid catalyst preferably is present in the phenolic resole resin composition in sufficient amount to promote rapid curing of the resin at the desired elevated resin hardening temperature. Generally, the strong acid catalyst is provided in the composition in an amount between about 0.5 to 20 parts per hundred parts of the phenolic resole resin solids (pphr), and more preferably between about 1 to 10 pphr. Expressed alternatively, the strong acid catalyst may be provided in the phenolic resole resin composition in an amount from about 5% to about 80% by weight of the combination of the etherified phosphate ester latent catalyst and strong acid catalyst. For example, the catalyst system or mixture may contain an aqueous mixture of about 30 weight percent of a strong acid catalyst and about 70 weight percent of the etherified phosphate ester latent catalyst. Such a catalyst may be formed by mixing aqueous solutions of the strong acid catalyst, e.g., a mixture of p-toluene sulfonic acid and orthophosphoric acid in a 2:1 weight ratio, with an aqueous solution of a phosphate ester of ethoxylated trimethylol propane.

The present invention also is directed to a method of making a fast curing, long pot life phenolic resin composition. In accordance with the method, a phenolic resin is first prepared from formaldehyde and phenol. A resin predominantly having the preferred highly methylolated species is prepared using a two-step process. In the first step, phenol is reacted with formaldehyde in an aqueous reaction medium under alkaline reaction conditions using an alkaline catalyst at a high F:P mole ratio. (F:P of 1.5:1 to 4:1.) Then in a second step, additional phenol and alkaline catalyst are added. The additional amount of phenol needed to obtain the desired final F:P mole ratio is added and reacted to obtain the ultimate resin. Suitable F:P mole ratios for the ultimate resin were identified previously, preferably, the F:P mole ratio is about 1.5 to 1.8. Temperatures and pH conditions for reacting the phenol and formaldehyde are well within the skill of the art. For example, in the first step of the process, the full complement of formaldehyde may be reacted with only half (50%) of the phenol, e.g., at an F:P mole ratio of about 3.4/1. Thereafter, the remaining portion of the phenol is added and the resin is reacted further to obtain an ultimate resin having an F:P mole ratio of about 1.7/1.

The amount of alkaline catalyst used in preparing the phenolic resin is preferably between about 0.6 to 1.4 part by weight per 100 parts by weight of total phenol added. The caustic (NaOH) solution is usually of approximately 50% strength. When a two stage addition of phenol is used, the catalyst is added in approximately the same proportion as the phenol. For example, if 50% of the phenol is initially added, then 50% of the total catalyst charge is initially added.

Thus, to only a portion of the phenol and alkaline catalyst, the full complement of formaldehyde is slowly added to drive the reaction to form the tetradimer. Adding the remaining phenol and alkaline catalyst consumes residual unreacted formaldehyde and causes a lowering of the resin's viscosity. The resulting resin can be characterized as a bimodal distribution of methylolated species with a large fraction of highly methylolated dimers and another significant fraction of predominately monomethylolated phenolic monomers. The bimodal distribution minimizes the level of 2,6 dimethylolphenol which is a highly reactive and generally undesirable species. The low level of this resin species results in the resin having better pot life and a lower tendency to show strong exotherms of the type which initiate at 55° C.

Alkaline reaction conditions for preparing the phenolic resin can be established by use of any of the wide variety of alkaline catalysts, organic and inorganic, known to those skilled in the art. On the basis of cost and performance, an alkali metal hydroxide is preferred such as sodium, lithium or potassium hydroxide. Sodium hydroxide is particularly preferred. Other catalysts include alkali metal carbonates such as sodium carbonate and potassium carbonate, alkaline earth hydroxides such as magnesium hydroxide, calcium hydroxide and barium hydroxide, aqueous ammonia and amines. The alkaline catalyst promotes the reaction of the formaldehyde with phenol to form a phenol-formaldehyde resole resin.

The resin may then be neutralized as needed, for example, so as to obtain better storage stability. Conventional acidic neutralizing agents can be used including, but not limited to, methane sulfonic, hydrochloric, phosphoric, and sulfuric acids. A variety of acidic latent curing agents also can be used to neutralize the resin, including for example, the etherified phosphate ester latent catalysts of this invention and the partial phosphate esters disclosed in U.S. Pat. No. 5,378,793. Generally, a sufficient amount of the neutralizing agent is added to establish a pH of between about 6.5 and 7.5 in the aqueous resin, although final pH levels as low as 4.0 often may also result in stable resin systems.

An etherified phosphate ester latent catalyst according to the present invention is then added to the resin. The etherified phosphate ester latent catalyst can also be used and preferably is used in combination with a strong acid catalyst. In particular, it is preferred to use a relative amount of these two components so as to obtain a desired combination of extended pot life and rapid cure. For example, the etherified phosphate ester latent catalyst typically will be added in a sufficient amount to retard curing of the resin in the presence of a strong acid catalyst at low to ambient temperatures. By varying the amount of the etherified phosphate ester latent catalyst relative to the amount of the strong acid catalyst, and by varying the total catalyst content of the resin composition, a wide range of pot lifes and cure speeds can be obtained. Moreover, it has been observed that voids in the resulting composite can be minimized or eliminated. In a preferred embodiment, a mixture of the etherified phosphate ester latent catalyst and the strong acid catalyst is added to the resin immediately prior to resin use.

The present invention also is directed to a method of making a hardened resin composite using the phenolic resin composition. Usually at low to ambient temperatures, a composite is formed by providing a resin composition comprising a mixture of (a) a phenolic resole resin, (b) an etherified phosphate ester latent catalyst, and (c) an optional strong acid catalyst, wherein the etherified phosphate ester latent catalyst is present in a sufficient amount to retard the curing of the resin in the presence of the optional strong acid catalyst at low to ambient temperatures. The resin composition may further be impregnated onto a substrate. Then, the temperature of the resin or the resin-impregnated substrate is raised to an elevated temperature to cure the resin and form the hardened composite. Preferably the temperature is raised to a temperature above about 60° C., and usually between about 65° C. to 85° C. Composites can be cured overnight at temperatures as low as 25° C. to 80° C., while initial cure temperatures should not exceed 80° C. to 90° C. to avoid blistering. Postcuring the composites at 80° C. to 100° C. enhances ultimate composite mechanical strength.

The resin composition of the present invention is suitable for hand layup and continuous laminating processes, for producing prepregs, for resin transfer molding (RTM), for pultrusion applications, for filament winding and for making sheet molding compound. For fiberglass reinforcement, one can use chopped strand glass mats that are currently used in preparing polyester hand lay-up composite products and phenolic-compatable glass such as CertainTeed RO9 Type 625 or PPG Hybon®. The equipment used for the manufacture of such reinforced composites is well known to those knowledgeable in this technology and in many cases basically comprises an impregnation tank containing the phenolic resole resin composition of the invention. During operation, the reinforcing agent such as glass fibers, glass fiber roving or glass fabric is immersed in the tank to impregnate the reinforcing agent with the resin composition. In the case of glass fibers, after impregnation, the fibers may be wound on a mandrel (filament winding) or pulled through a die (pultrusion) to produce the desired composite shape.

EXAMPLES

The invention will be further described by reference to the following examples. These examples should not be construed in any way as limiting the invention.

Example 1

The tri-phosphate ester of ethoxylated trimethylol propane in a meta:ortho ratio of 2:1 is commercially available (P-Chem, 100 Old Latexo Road, P.O. Box 977, Latexo, Tex. 75849) and is blended with a strong acid (p-toluene sulfonic acid) and orthophosphoric acid (85% $H_3PO_4$). 70 weight % of the phosphate ester is blended with 10 weight % p-toluene sulfonic acid (in 30% $H_2O$) and 20 weight % orthophosphoric acid (85% $H_3PO_4$). The resulting catalyst containing the etherified phosphate ester latent catalyst is then added to 274G38 phenolic resole resin (G-P Resins Inc.) as the base resin. The performance of the etherified phosphate ester latent catalyst then is compared to the use of a control curing catalyst in the same resin. The control curing catalyst is formed by blending 10 weight % p-toluene sulfonic acid (in 30% $H_2O$), 20 weight % phosphoric acid (85% $H_3PO_4$), 65 weight % aminotriethanol phosphate (ATP—see U.S. Pat. No. 5,864,003) (containing 15% water for viscosity reduction) and 5 weight % butyl carbitol (solvent). The characteristics of the etherified phosphate ester latent catalyst and the control catalyst are reported in Table 1 below.

TABLE 1

| | Control Catalyst Weight % | Etherified phosphate ester latent catalyst Weight % |
|---|---|---|
| p-TSA, 30% $H_2O$ | 10 | 10 |
| Butyl Carbitol | 5 | — |
| $H_3PO_4$, 85% | 20 | 20 |
| ATP | 65 | — |
| Etherified phosphate ester catalyst | — | 70 |
| Total | 100 | 100 |

100 parts of the 274G38 phenolic resole resin is combined with 6 parts of the catalyst containing the etherified phosphate ester latent catalyst. Similarly, 100 parts of the 274G38 phenolic resole resin is combined with 6 parts of the control catalyst. Gel time and pot life of each of the respective samples are compared. The gel times (at 70° C.) and pot life of the respective samples are reported in Table 2 below.

TABLE 2

| Sample | Composition | Gel Time @ 70° C. | Pot Life |
|---|---|---|---|
| 1 | 274G38 (100 parts) and control catalyst (6 parts) | 500 seconds | 50 minutes |
| 2 | 274G38 (100 parts) and etherified phosphate ester latent catalyst (6 parts) | 500 seconds | 48 minutes |

The above materials are mixed and left at ambient temperature for 16 hours. The materials are then incubated at 45° C. for 15 minutes. The resulting castings are examined for surface changes, defects or voids. It is observed that the casting made with the catalyst containing the etherified phosphate ester latent catalyst had markedly reduced pin holes on its surface as compared to the casting made with the control catalyst. Thus, the catalyst containing the etherified phosphate ester latent catalyst results in a marked reduction in voids or pinholes in the resulting casting as compared to the control but with comparable gel times and pot life as compared to the control (Table 2).

Example 2

The same etherified phosphate ester latent catalyst as described in Example 1 is used. The catalyst containing the etherified phosphate ester latent catalyst is formed by blending 72 weight % of the phosphate ester, 8 weight % p-toluene sulfonic acid (in 30% $H_2O$) and 20 weight % phosphoric acid (85% $H_3PO_4$). The resulting catalyst containing the etherified phosphate ester latent catalyst is then added to 274G38 phenolic resole resin as the base resin. The performance of the catalyst containing the etherified phosphate ester latent catalyst then is compared to the rate of cure obtained using the same control curing catalyst of Example 1.

100 parts of the 274G38 phenolic resole resin is combined with 6 parts of the catalyst containing the etherified phosphate ester latent catalyst of this example. Similarly, 100 parts of the 274G38 phenolic resole resin is combined with 6 parts of the control catalyst of Example 1. Gel time and pot life of each of the respective samples are compared. Results demonstrate that the pot life of the catalyst containing the etherified phosphate ester latent catalyst is comparable to that of the control catalyst specimen of Example 1. As in example 1, the above materials are mixed and left at ambient temperature for 16 hours. The materials are then incubated at 45° C. for 15 minutes. The resulting castings are examined for surface changes, defects or voids. Analytical pictures confirm that the pinholes and voids on the surface of the casting made with the catalyst composition based on the etherified phosphate ester latent catalyst are markedly reduced as compared to the casting made with the control catalyst specimen of Example 1.

Example 3

A curing catalyst in accordance with the present invention is formed by first reacting Heloxy™ Modifier 8 (a monoepoxy functional diluent) with orthophosphoric acid (85% $H_3PO_4$) and then blending the resultant etherified phosphate ester latent catalyst with a strong acid (p-toluene sulfonic acid). To form the etherified phosphate ester, 37.5 parts Heloxy™ Modifier 8 is added slowly to 52.5 parts phosphoric acid (85% $H_3PO_4$) with control (cooling) of the exotherm (maximum temperature 55° C.). The resulting solution is then added to 10 parts p-TSA. The solution is mixed well and 15 parts of ethoxylated trimethylol propane (a diluent) is added to form the phenolic curing catalyst. The control curing catalyst is formed by reacting three moles of triethanol amine with each mole of phosphoric acid supplied as polyphosphoric acid to form ATP (see Example 1). To prepare the final control catalyst, 65 parts ATP is mixed with 20 parts phosphoric acid, 10 parts p-TSA and 5 parts Butyl carbitol. The characteristics of the curing catalyst of this invention and the control catalyst are reported in Table 3 below.

TABLE 3

| | Control Catalyst (parts) | Curing Catalyst (parts) |
|---|---|---|
| Heloxy ™ Modifier 8 | — | 37.5 |
| p-TSA | 10 | 10 |
| Butyl Carbitol | 5 | — |
| Ethoxylated trimethylol propane (diluent) | — | 15 |
| $H_3PO_4$, 85% | 20 | 52.5 |
| ATP | 65 | — |
| Total | 100 | 115 |

100 parts of the 274G38 phenolic resole resin is combined with 7 parts of the curing catalyst of this invention. Similarly, 100 parts of the 274G38 phenolic resole resin is combined with 6 parts of the control catalyst. Gel time and pot life of each of the respective samples are compared. The gel times (at 90° C.) and pot life of the respective samples are reported in Table 4 below.

TABLE 4

| Sample | Composition | Gel Time @ 90° C. | Pot Life |
|---|---|---|---|
| 1 | 274G38 (100 parts) and control catalyst (6 parts) | 130 seconds | 60 minutes |
| 2 | 274G38 (100 parts) and invention curing catalyst (7 parts) | 125–135 seconds | 60 minutes |

The resulting castings are examined for surface changes, defects or voids. It is observed that the casting made with the curing catalyst of this invention had markedly reduced pinholes on its surface as compared to the casting made with the control catalyst. Thus, the curing catalyst of this invention results in a marked reduction in voids or pinholes in the resulting casting as compared to the control but with comparable gel times and pot life as compared to the control.

Example 4

A curing catalyst according to the present invention is formed by reacting the glycidol ester of a synthetic saturated monocarboxylic acid mixture of highly branched $C_{10}$ isomers (Cardura™ Glycidyl Ester E10P) with orthophosphoric acid (85% $H_3PO_4$) and then blending the phosphate ester with a strong acid (p-toluene sulfonic acid). To prepare the phosphate ester, 37.5 parts Cardura™ Glycidyl Ester E10P is added slowly to 52.5 parts orthophosphoric Acid (85% $H_3PO_4$) with control (cooling) of the exotherm (maximum termperature 55° C.). The curing catalyst then is prepared by adding 10 parts p-TSA slowly to this mixture. The solution is mixed well and 15 parts of ethoxylated trimethylol propane (a diluent) is added to form the curing catalyst. The control curing catalyst is formed as in Example 1 by reacting each mole of phosphoric acid (as polyphosphoric acid) with three moles of triethanolamine to form ATP. To form the control catalyst, 65 parts ATP is mixed with 20 parts phosphoric acid (85% $H_3PO_4$), 10 parts p-TSA and 5 parts Butyl carbitol. The characteristics of the curing catalyst of this invention and the control catalyst are reported in Table 5 below.

TABLE 5

| | Control Catalyst (parts) | Curing Catalyst (parts) |
|---|---|---|
| Cardura ™ Glycidyl Ester E10P | — | 37.5 |
| p-TSA | 10 | 10 |
| Butyl Carbitol | 5 | — |
| Ethoxylated trimethylol propane (diluent) | — | 15 |
| $H_3PO_4$, 85% | 20 | 52.5 |
| ATP | 65 | — |
| Total | 100 | 115 |

100 parts of the 274G38 phenolic resole resin is combined with 7 parts of the phosphate ester latent catalyst. Similarly, 100 parts of the 274G38 phenolic resole resin is combined with 6 parts of the control catalyst. Gel time and pot life of each of the respective samples are compared. The gel times (at 90° C.) and pot life of the respective samples are reported in Table 6 below.

TABLE 6

| Sample | Composition | Gel Time @ 90° C. | Pot Life |
|---|---|---|---|
| 1 | 274G38 (100 parts) and control catalyst (6 parts) | 130 seconds | 60 minutes |
| 2 | 274G38 (100 parts) and curing catalyst (7 parts) | 130 seconds | 60 minutes |

Resulting castings made using both catalyst systems are examined for surface changes, defects or voids. It is observed that the casting made with the curing catalyst of this invention had markedly reduced pinholes on its surface as compared to the casting made with the control catalyst. Thus, the curing catalyst of the present invention results in a marked reduction in voids or pinholes in the resulting casting as compared to the control but with comparable gel times and pot life as compared to the control.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

The invention claimed is:

1. A resin composition capable of being thermally cured consisting essentially of a mixture of (a) a phenolic resole resin, (b) an optional strong acid curing catalyst, and (c) an etherified phosphate ester latent catalyst, the etherified phosphate ester latent catalyst being selected from the group consisting of (1) a phosphate ester produced by adding an alkoxylated polyol to phosphoric acid, said polyol being selected from the group consisting of glycerol, pentaerythritol, sucrose, a dihydric phenol, a polyhydric phenol, resorcinol, phloroglucinol, neopentyl glycol, and trimethylol propane, and (2) a phosphate ester of a mono epoxy functional diluent of the following formula:

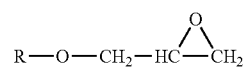

wherein R is an alkyl of 1 to 18 carbon atoms or an alkyl carbonyl of 1 to 18 alkyl carbon atoms, and wherein the alkyl can be straight or branched, produced by adding the mono epoxy functional diluent to phosphoric acid.

2. A method of making a resin composition consisting essentially of reacting phenol with formaldehyde to form a phenolic resole resin, neutralizing the resin, adding an etherified phosphate ester latent catalyst, and optionally adding a strong acid curing catalyst, the etherified phosphate ester latent catalyst being selected from the group consisting of (1) a phosphate ester produced by adding an alkoxylated polyol to phosphoric acid, said polyol being selected from the group consisting of glycerol, pentaerythritol, sucrose, a dihydric phenol, a polyhydric phenol, resorcinol, phloroglucinol, neopentyl glycol, and trimethylol propane, and (2) a phosphate ester of a mono epoxy functional diluent of the following formula:

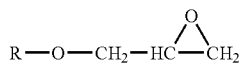

wherein R is an alkyl of 1 to 18 carbon atoms or an alkyl carbonyl of 1 to 18 alkyl carbon atoms, and wherein the alkyl can be straight or branched, produced by adding the mono epoxy functional diluent to phosphoric acid.

3. A method of making a reinforced resin composite consisting essentially of (1) impregnating a substrate with a resin composition comprising a mixture of (a) a phenolic resole resin (b) an optional strong acid curing catalyst and (c) an etherified phosphate ester latent catalyst, wherein the etherified phosphate ester latent catalyst is selected from the group consisting of (A) a phosphate ester produced by adding an alkoxylated polyol to phosphoric acid, said polyol being selected from the group consisting of glycerol, pentaerythritol, sucrose, a dihydric phenol, a polyhydric phenol, resorcinol, phloroglucinol, neopentyl glycol, and trimethylol propane, and (B) a phosphate ester of a mono epoxy functional diluent of the following formula:

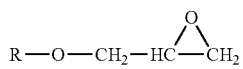

wherein R is an alkyl of 1 to 18 carbon atoms or an alkyl carbonyl of 1 to 18 alkyl carbon atoms, and wherein the alkyl can be straight or branched, produced by adding the mono epoxy functional diluent to phosphoric acid and (2) curing the resin impregnated substrate.

4. A reinforced resin composite prepared by (1) impregnating a substrate with a resin composition consisting essentially of a mixture of (a) a phenolic resole resin, (b) an optional strong acid curing catalyst, and (c) an etherified phosphate ester latent catalyst, wherein the etherified phosphate ester latent catalyst is selected from the group consisting of (A) a phosphate ester produced by adding an alkoxylated polyol to phosphoric acid, said polyol being selected from the group consisting of glycerol, pentaerythritol, sucrose, a dihydric phenol, a polyhydric phenol, resorcinol, phloroglucinol, neopentyl glycol, and trimethylol propane, and (B) a phosphate ester of a mono epoxy functional diluent of the following formula:

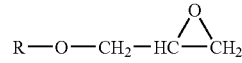

wherein R is an alkyl of 1 to 18 carbon atoms or an alkyl carbonyl of 1 to 18 alkyl carbon atoms, and wherein the alkyl can be straight or branched, produced by adding the mono epoxy functional diluent to phosphoric acid, and (2) curing the resin impregnated substrate.

5. A resin composition capable of being thermally cured consisting essentially of a mixture of (a) a neutralized phenolic resole resin, and (b) an etherified phosphate ester latent catalyst selected from the group consisting of (1) a phosphate ester produced by adding an alkoxylated polyol to phosphoric acid, said polyol being selected from the group consisting of glycerol, pentaerythritol, sucrose, a dihydric phenol, a polyhydric phenol, resorcinol, phloroglucinol, neopentyl glycol, and trimethylol propane, and (2) a phosphate ester of a mono epoxy functional diluent of the following formula:

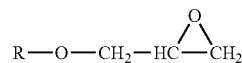

wherein R is an alkyl of 1 to 18 carbon atoms or an alkyl carbonyl of 1 to 18 alkyl carbon atoms, and wherein the alkyl can be straight or branched, produced by adding the mono epoxy functional diluent to phosphoric acid.

6. A method of making a reinforced resin composite consisting essentially of curing a resin composition comprising a mixture of (a) a phenolic resole resin (b) an optional strong acid curing catalyst and (c) an etherified phosphate ester latent catalyst, wherein the etherified phosphate ester latent catalyst is selected from the group consisting of (1) a phosphate ester produced by adding an alkoxylated polyol to phosphoric acid, said polyol being selected from the group consisting of glycerol, pentaerythritol, sucrose, a dihydric phenol, a polyhydric phenol, resorcinol, phloroglucinol, neopentyl glycol, and trimethylol propane, and (2) a phosphate ester of a mono epoxy functional diluent of the following formula:

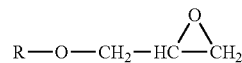

wherein R is an alkyl of 1 to 18 carbon atoms or an alkyl carbonyl of 1 to 18 alkyl carbon atoms, and wherein the alkyl can be straight or branched, produced by adding the mono epoxy functional diluent to phosphoric acid.

7. The composition of claim 1, or the composition of claim 5 wherein the phenolic resole resin is prepared from a substituted or unsubstituted phenol.

8. The composition of claim 1, or the composition of claim 5 wherein the phenolic resole resin is prepared from hydroxybenzene.

9. The composition of claim 1, or the composition of claim 5 wherein the phenolic resole resin is prepared from hydroxbenzene and formaldehyde, optionally with one or more additional aldehydes.

10. The composition of claim 1, or the composition of claim 5 wherein the phenolic resin is prepared from hydroxybenzene and formaldehyde as the sole aldehyde.

11. The composition of claim 1, or the composition of claim 5 wherein the phenolic resin is prepared from hydroxybenzene and formaldehyde as the sole aldehyde and a portion of the hydroxybenzene is first reacted with formaldehyde at a formaldehyde to hydroxybenzene mole ratio of between about 1.5:1 and 4:1, and then additional hydroxybenzene is added and reacted to obtain the phenolic resole resin.

12. The composition of claim 1, or the composition of claim 5 wherein the etherified phosphate ester latent catalyst is a reaction product of ethoxylated trimethylol propane and polyphosphoric acid.

13. The composition of claim 1, or the composition of claim 5 wherein the etherified phosphate ester latent catalyst is prepared by a) heating polyphosphoric acid to 150–175° F. and b) adding ethoxylated trimethylol propane under atmospheric pressure conditions, wherein the polyphosphoric acid and the ethoxylated trimethylol propane are present in a 3:1 molar ratio of phosphoric acid to ethoxylated trimethylol propane.

14. The composition of claim 1, or the composition of claim 5 wherein the etherified phosphate ester latent catalyst is prepared from an epoxy functional diluent selected from the group consisting of an aliphatic monoglycidyl ether containing predominantly $C_{12}$ and $C_{14}$ alkyl chains and a glycidol ester of a saturated monocarboxylic acid mixture of highly branched $C_{10}$ isomers.

15. The composition of claim 1, or the composition of claim 5 wherein the strong acid catalyst is selected from the group consisting of hydrochloric acid, sulfuric acid, phosphoric acid, trichloroacetic acid, an organo-sulfonic acid, and mixtures thereof.

16. The composition of claim 1, or the composition of claim 5 wherein the strong acid curing catalyst is a mixture of phosphoric acid and one or more organo-sulfonic acids.

17. The composition of claim 1, or the composition of claim 5 wherein the strong acid curing catalyst is a mixture of phosphoric acid and an organo-sulfonic acid and the organo-sulfonic acid is a mixture of toluene sulfonic acid and xylene sulfonic acid.

18. The composition of claim 1, or the composition of claim 5 wherein the phenolic resole resin is prepared using a ratio of formaldehyde to phenol of between about 0.9:1 to 3.5:1.

19. The composition of claim 1, or the composition of claim 5 wherein the phenolic resole resin is prepared using a ratio of formaldehyde to phenol of between about 1:1 to 1.8:1.

20. The method of claim 3 wherein the substrate is selected from glass fibers, glass fiber roving and glass fabric.

21. The method of claim 2, the method of claim 3, or the method of claim 6 wherein the phenolic resole resin is prepared from a substituted or unsubstituted phenol.

22. The method of claim 2, the method of claim 3, or the method of claim 6 wherein the phenolic resole resin is prepared from hydroxybenzene.

23. The method of claim 2, the method of claim 3, or the method of claim 6 wherein the phenolic resole resin is prepared from hydroxbenzene and formaldehyde, optionally with one or more additional aldehydes.

24. The method of claim 2, the method of claim 3, or the method of claim 6 wherein the phenolic resin is prepared from hydroxybenzene and formaldehyde as the sole aldehyde.

25. The method of claim 2, the method of claim 3, or the method of claim 6 wherein the phenolic resin is prepared from hydroxybenzene and formaldehyde as the sole aldehyde and a portion of the hydroxybenzene is first reacted with formaldehyde at a formaldehyde to hydroxybenzene mole ratio of between about 1.5:1 and 4:1, and then additional hydroxybenzene is added and reacted to obtain the phenolic resole resin.

26. The method of claim 2, the method of claim 3, or the method of claim 6 wherein the etherified phosphate ester latent catalyst is a reaction product of ethoxylated trimethylol propane and polyphosphoric acid.

27. The method of claim 2, the method of claim 3, or the method of claim 6 wherein the etherified phosphate ester latent catalyst is prepared by a) heating polyphosphoric acid to 150–175° F. and b) adding ethoxylated trimethylol propane under atmospheric pressure conditions, wherein the polyphosphoric acid and the ethoxylated trimethylol propane are present in a 3:1 molar ratio of phosphoric acid to ethoxylated trimethylol propane.

28. The method of claim 2, the method of claim 3, or the method of claim 6 wherein the etherified phosphate ester latent catalyst is prepared from an epoxy functional diluent selected from the group consisting of an aliphatic monoglycidyl ether containing predominantly $C_{12}$ and $C_{14}$ alkyl chains and a glycidol ester of a saturated monocarboxylic acid mixture of highly branched $C_{10}$ isomers.

29. The method of claim 2, the method of claim 3, or the method of claim 6 wherein the strong acid catalyst is selected from the group consisting of hydrochloric acid, sulfuric acid, phosphoric acid, trichloroacetic acid, an organo-sulfonic acid, and mixtures thereof.

30. The method of claim 2, the method of claim 3, or the method of claim 6 wherein the strong acid curing catalyst is a mixture of phosphoric acid and one or more organo-sulfonic acids.

31. The method of claim 2, the method of claim 3, or the method of claim 6 wherein the strong acid curing catalyst is a mixture of phosphoric acid and an organo-sulfonic acid and the organo-sulfonic acid is a mixture of toluene sulfonic acid and xylene sulfonic acid.

32. The method of claim 2, the method of claim 3, or the method of claim 6 wherein the phenolic resole resin is prepared using a ratio of formaldehyde to phenol of between about 0.9:1 to 3.5:1.

33. The method of claim 2, the method of claim 3, or the method of claim 6 wherein the phenolic resole resin is prepared using a ratio of formaldehyde to phenol of between about 1:1 to 1.8:1.

34. The reinforced resin composite of claim 4 wherein the phenolic resole resin is prepared from a substituted or unsubstituted phenol.

35. The reinforced resin composite of claim 4 wherein the phenolic resole resin is prepared from hydroxybenzene.

36. The reinforced resin composite of claim 4 wherein the phenolic resole resin is prepared from hydroxbenzene and formaldehyde, optionally with one or more additional aldehydes.

37. The reinforced resin composite of claim 4 wherein the phenolic resin is prepared from hydroxybenzene and formaldehyde as the sole aldehyde.

38. The reinforced resin composite of claim 4 wherein the phenolic resin is prepared from hydroxybenzene and formaldehyde as the sole aldehyde and a portion of the hydroxybenzene is first reacted with formaldehyde at a formaldehyde to hydroxybenzene mole ratio of between about 1.5:1 and 4:1, and then additional hydroxybenzene is added and reacted to obtain the phenolic resole resin.

39. The reinforced resin composite of claim 4 wherein the etherified phosphate ester latent catalyst is a reaction product of ethoxylated trimethylol propane and polyphosphoric acid.

40. The reinforced resin composite of claim 4 wherein the etherified phosphate ester latent catalyst is prepared by a) heating polyphosphoric acid to 150–175° F. and b) adding ethoxylated trimethylol propane under atmospheric pressure conditions, wherein the polyphosphoric acid and the ethoxylated trimethylol propane are present in a 3:1 molar ratio of phosphoric acid to ethoxylated trimethylol propane.

41. The reinforced resin composite of claim 4 wherein the etherified phosphate ester latent catalyst is prepared from an epoxy functional diluent selected from the group consisting of an aliphatic monoglycidyl ether containing predominantly $C_{12}$ and $C_{14}$ alkyl chains and a glycidol ester of a saturated monocarboxylic acid mixture of highly branched $C_{10}$ isomers.

42. The reinforced resin composite of claim 4 wherein the strong acid catalyst is selected from the group consisting of hydrochloric acid, sulfuric acid, phosphoric acid, trichloroacetic acid, an organo-sulfonic acid, and mixtures thereof.

43. The reinforced resin composite of claim 4 wherein the strong acid curing catalyst is a mixture of phosphoric acid and one or more organo-sulfonic acids.

44. The reinforced resin composite of claim 4 wherein the strong acid curing catalyst is a mixture of phosphoric acid and an organo-sulfonic acid and the organo-sulfonic acid is a mixture of toluene sulfonic acid and xylene sulfonic acid.

45. The reinforced resin composite of claim 4 wherein the phenolic resole resin is prepared using a ratio of formaldehyde to phenol of between about 0.9:1 to 3.5:1.

46. The reinforced resin composite of claim 4 wherein the phenolic resole resin is prepared using a ratio of formaldehyde to phenol of between about 1:1 to 1.8:1.

* * * * *